(12) United States Patent
Fideler

(10) Patent No.: US 6,896,636 B2
(45) Date of Patent: May 24, 2005

(54) OIL SYSTEM

(75) Inventor: Winfried Fideler, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/352,270

(22) Filed: Jan. 27, 2003

(65) Prior Publication Data

US 2003/0158010 A1 Aug. 21, 2003

(30) Foreign Application Priority Data

Feb. 20, 2002 (DE) .......................................... 102 07 076

(51) Int. Cl.⁷ ............................................. F16H 31/00
(52) U.S. Cl. ..................... 475/116; 475/120; 475/127; 475/128; 74/335; 477/121; 477/127; 477/128; 477/129; 477/130; 477/135; 477/140; 91/441; 137/605
(58) Field of Search ................................. 475/116, 120, 475/127, 128; 74/335; 477/121, 127, 128, 129, 130, 135, 140; 91/441; 137/605

(56) References Cited

U.S. PATENT DOCUMENTS 3,771,422 A * 11/1973 Kamman ..................... 91/405
3,938,637 A * 2/1976 Murakami ................ 192/113.5
3,951,042 A * 4/1976 Weiss ......................... 91/363 R
4,349,041 A * 9/1982 Bates .............................. 137/1
4,359,931 A * 11/1982 Palmersheim et al. ......... 91/436
4,640,401 A * 2/1987 Koltookian ................. 192/85 R
4,972,868 A * 11/1990 Davis et al. .............. 137/116.5
5,313,873 A * 5/1994 Gall et al. ..................... 91/429
5,535,865 A * 7/1996 Haka et al. ................. 192/54.3
5,778,756 A * 7/1998 Haga et al. .................... 91/441
2004/0006981 A1 * 1/2004 Dong et al. .................... 60/464

FOREIGN PATENT DOCUMENTS

| DE | 41 30 128 A1 | 3/1993 | ............ F15B/1/02 |
|---|---|---|---|
| DE | 197 28 228 A1 | 2/1999 | ........... B60K/17/92 |
| DE | 199 30 356 A1 | 1/2001 | ........... F16H/63/00 |
| DE | 10125259 A1 * | 11/2002 | ........... F16H/47/02 |
| DE | 101 25 260 A1 | 11/2002 | ........... F16H/57/04 |
| EP | 0 550 098 B1 | 5/1996 | ........... F16H/47/02 |

* cited by examiner

Primary Examiner—Saul Rodriguez
Assistant Examiner—David D. Le
(74) Attorney, Agent, or Firm—Davis & Bujold, P.B.L.C.

(57) ABSTRACT

The oil supply device for a change-under-load transmission having a high-pressure circuit and a low-pressure circuit is designed in such a manner that the high-pressure feed line to the consumer devices of the transmission system incorporates an inlet aperture of small size, the low-pressure feed line is connected between the inlet aperture and the consumer device, and the low-pressure feed line can be cut off from the high-pressure feed line by a one-way valve.

6 Claims, 1 Drawing Sheet

OIL SYSTEM

FIELD OF THE INVENTION

The present invention concerns an oil supply device for the hydraulic transmission control of an automatic transmission and, in particular, a change-under-load transmission with a demand-orientated oil supply system and a method for operating the oil supply device.

BACKGROUND OF THE INVENTION

According to the state of the prior art, the oil supply of a change-under-load transmission provides, on one hand, for the lubrication and cooling of transmission components and, on the other hand, for their control by hydraulic means.

For the hydraulic transmission control of a change-under-load transmission, a continuous pump delivery flow is needed so that, at any desired point in time, the gear-shift elements can be filled without delay. During steady state operation, on the other hand, a continuous high pressure of about 15 to 30 bar is needed in order to hold the engaged gears or the variator discs steady, and a smaller delivery flow is required for this.

For a gear-shift element change, a change-under-load transmission at first needs a large delivery flow, at relatively low pressure, to fill the gear-shift element, and then, during modulation, when the clutch disc is engaged, a higher pressure with a low delivery flow, for example.

In addition most of the delivery flow is needed for lubrication and cooling of the transmission, and a low pressure of about 2 to 4 bar must be established for this.

A demand-orientated oil supply system of the prior art usually comprises two separate delivery flows with different pressures, which can be adjusted as necessary, as described for example in the context of patent specification EP 0 550 098 B1. This discloses an oil supply arrangement having a first and a second mechanically driven pump hydraulically coupled to one another in such manner that the control system of the second pump can be regulated, so that the demand-orientated oil supply can be adjusted by the pumps, by means of a regulator device.

This oil supply has the disadvantage that because of the separate delivery flows or oil circuits and the two mechanically driven pumps, its construction is very elaborate and entails high production and maintenance costs.

Further, in the context of DE 101 262 60 by the present applicant, it is proposed to provide the necessary, demand-orientated oil supply by means of a transmission oil pump, which delivers oil at high pressure only during a gear shift operation but which, during steady state, is operated at a low pressure level on the order of 3 to 5 bar.

To produce the required small delivery flow at high pressure at times other than during gear shift operations, as required in order to hold the engaged gears or the variator discs steady, a pressure-volume flow converter is provided, which is integrated into the oil circuit. For a low-pressure delivery flow, this pressure-volume flow converter produces a smaller delivery flow at high pressure, and corresponds to a motor/pump combination. High-pressure and low-pressure feed lines, respectively, are provided for the high- and low-pressure delivery flows.

This proposed solution also takes up structural space and involves several mechanical components.

SUMMARY OF THE INVENTION

Starting from the state of the art mentioned at the beginning, the purpose of the present invention is to provide an oil supply device for hydraulic transmission control of an automatic transmission, in particular a change-under-load transmission with a demand-orientated oil supply stem, which takes up little structural space and can be produced at favourable cost. In addition, a method for operating the oil supply device according to the invention is to be described.

In this system, the oil circuit comprises a high-pressure circuit with high-pressure feed lines to the consumer devices and a low-pressure circuit with corresponding low-pressure feed lines.

BRIEF DESCRIPTION OF THE DRAWING

The invention will now be described, by way of example, with reference to the accompanying drawings in which.

DETAILED DESCRIPTION OF THE INVENTION

Figure 1:
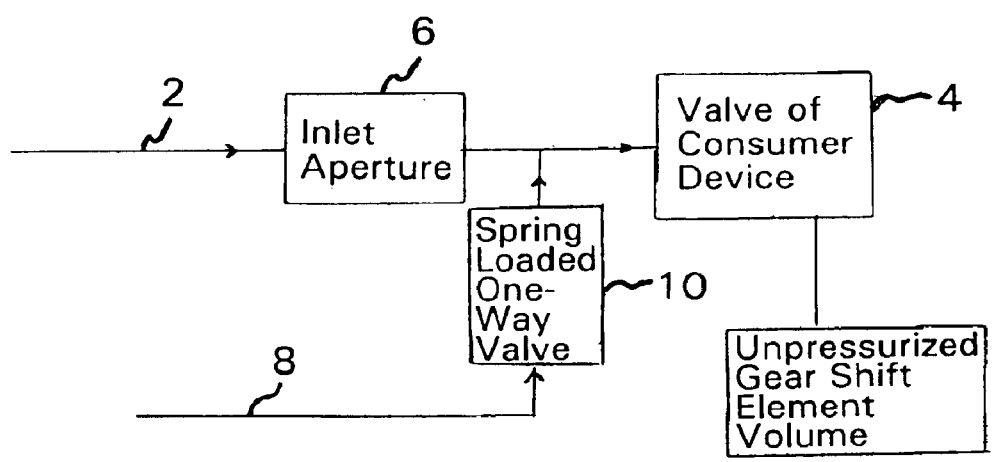
FIG. 1 is a diagrammatic drawing showing the oil supply system of the present invention.

According to the invention it is proposed to position, in the respective high-pressure feed lines 2 to the valves 4 of the consumer devices (clutches, variator discs, etc.), in each case an inlet aperture 6 of small size, and to connect the low-pressure feed line 8 between this inlet aperture 6 and the corresponding valve. In this arrangement, the low-pressure feed line 8 is separated from the high-pressure reed line 2 by a spring-loaded one-way valve 10.

This arrangement or oil supply device according to the invention is operated as follows: when no gear shift operation is taking place, i.e., during steady state operation, only minimal high-pressure delivery flow passes through and, as a result, no pressure drop occurs at the inlet aperture 6 so that high pressure prevails between the inlet aperture 6 and the valve 4 of the consumer device. The low-pressure circuit 8 remains cut off from the high-pressure delivery flow by the closed one-way valve 10.

When a gear-shift element or adjustment device is actuated, for example the variator discs, the high pressure between the inlet aperture 6 and the valve 4 falls when the unpressurized additional gear-shift element volume 12 is connected thereto, the one-way valve 10 opens, and the gear-shift element is filled via the low-pressure circuit. During this, only a small amount of oil can flow out of the high-pressure circuit because of the small size of the inlet aperture 6.

At the end of the gear-shift element filling phase the delivery flow resumes very rapidly and, for example, a gear-shift element pressure is built up which closes the non-return valve 10. The subsequent main modulation of the gear-shift element pressure is effected by the high-pressure circuit 2.

The oil supply system, according to the invention, has the advantage that the two phases of "filling" and "modulation" are fed from separate circuits during a shifting operation or adjustment process.

In this way, the prerequisites are provided for implementing a demand-optimized dual-circuit system for the hydraulic control unit. The high-pressure circuit can be reduced to a minimum in relation to its delivery flow.

The structural space occupied by the proposed oil supply device and its production costs are very small.

What is claimed is:

1. An oil supply device for a consumer device in an automatic transmission wherein the consumer device operates in a steady state mode requiring a low volume supply of fluid at a high pressure and in a gear shifting mode presenting an additional unpressurized gear shift volume requiring a higher volume supply of fluid at a lower pressure, the oil supply device comprising:

a high pressure feed line;

a low pressure feed line;

a restricted inlet aperture located between the high pressure feed line and an input of the consumer device to provide a restriction in a fluid flow from the high pressure feed line to provide a low volume flow of fluid at the high pressure to the consumer device; and a one way valve located between the low pressure feed line and the input of the consumer device to provide, in conjunction, a higher volume flow of fluid at the lower pressure to the consumer device;

wherein, when the consumer device presents the additional unpressurized gear shift volume to the oil supply device upon entering the gear shifting mode, the restriction in the fluid flow from the high pressure feed line, provided by the restricted inlet aperture, results in a decrease in a fluid pressure at the input to the consumer device; and the decrease in fluid pressure at the input to the consumer device induces a flow of the higher volume of fluid at a lower pressure from the low pressure feed line to the consumer device.

2. The oil supply device according to claim 1, wherein the one-way valve is a spring-loaded one-way valve.

3. The oil supply device according to claim 1, wherein the automatic transmission is a change-under-load transmission with a demand-orientated oil supply.

4. A method of operation of an oil supply device for a consumer device in an automatic transmission wherein the consumer device operates in a steady state mode requiring a low volume supply of fluid at a high pressure and a gear shifting mode presenting an additional unpressurized gear shift volume requiring a higher volume supply of fluid at a lower pressure, the oil supply device comprising the steps of:

providing a flow of fluid at the high pressure to an input of the consumer device from a high pressure feed line and through a restricted inlet aperture to provide a low volume supply of fluid at a high pressure to the consumer device during steady state operation of the consumer device; and when the consumer device presents the additional unpressurized gear shift volume to the oil supply device upon entering the gear shifting mode; providing fluid flow at the lower pressure to the input of the consumer device from a low pressure feed line and through a one way valve connected from the low pressure feed line and to the input of the consumer device to provide the low volume supply of fluid at a high pressure to the consumer device upon the consumer device entering the gear shifting mode; wherein the restriction in the flow of fluid from the high pressure feed line provided by the restricted inlet aperture results in a decrease in a fluid pressure at the input to the consumer device, and the decrease in fluid pressure at the input to the consumer device causes a flow of the higher volume of fluid at a lower pressure from the low pressure feed line to the consumer device.

5. The method according to claim 4, further comprising the steps of, when the consumer device is actuated, allowing the high pressure between the inlet aperture and the consumer device to fall because of an additional connection of an unpressurized gear-shift element volume, and opening the one-way valve and filling the consumer device via the low-pressure circuit whereby a minimal flow of filling oil to the consumer device occurs from the high-pressure circuit through the inlet aperture.

6. The method according to claim 4, further comprising the step of, after completion of a filling phase of the when consumer device, rapidly resuming delivery flow so that pressure builds up and closes the one-way valve and subsequent pressure modulation is effected by the high-pressure circuit.

* * * * *